United States Patent [19]

Honer

[11] 3,953,238

[45] Apr. 27, 1976

[54] MULTICELL SEAWATER BATTERY

[75] Inventor: Harold Nickolas Honer, Raleigh, N.C.

[73] Assignee: ESB Incorporated, Philadelphia, Pa.

[22] Filed: Sept. 16, 1974

[21] Appl. No.: 506,314

[52] U.S. Cl. .................................. 136/90; 136/110; 136/112
[51] Int. Cl.² .......................................... H01M 6/30
[58] Field of Search ................ 136/90, 91, 92, 110, 136/112, 114, 10, 108, 100

[56] References Cited
UNITED STATES PATENTS

| | | | |
|---|---|---|---|
| 3,321,335 | 5/1967 | Wilson | 136/90 |
| 3,451,855 | 6/1969 | Jones et al. | 136/90 |
| 3,472,699 | 10/1969 | Jackley et al. | 136/90 |
| 3,496,025 | 2/1970 | Abe et al. | 136/90 |

Primary Examiner—Maynard R. Wilbur
Assistant Examiner—G. E. Montone
Attorney, Agent, or Firm—Wm. Wharton Smith; Robert H. Robinson; Anthony J. Rossi

[57] ABSTRACT

A Multicell seawater battery is provided with a top venting means. The venting means comprises a series of passages each located above and communicating with a particular cell. The several passages are connected by ports alternately at one end and at the other end of the cells to form a zig-zag conduit at the top of the battery. A similar passage may be located at the bottom of the battery. The improved porting reduces electrical losses to ground and also reduces the background noise of the battery.

8 Claims, 13 Drawing Figures

MULTICELL SEAWATER BATTERY

BACKGROUND OF THE INVENTION

1. Field of the Invention

This invention relates to reserve type primary galvanic batteries. In particular, it relates to reserve batteries which operate by immersion in seawater.

2. Description of the Prior Art

There is a class of batteries employing zinc, aluminum or magnesium anodes and silver chloride, copper chloride other halides of copper or lead chloride cathodes which are activated by and operate submerged in a weak aqueous electrolyte such as seawater.

As a generality, it has been found that for reasonable galvanic battery operation each cell of a battery should have its own electrolyte and that the electrolyte of one cell should not be linked to the electrolyte of another cell. If there are electrolyte bridges from cell to cell, a leakage current will flow through the electrolyte bridge. The leakage current represents a non-productive drain on the battery and results in reduced battery output and life. However, in the present instance, the resistivity of the electrolyte is so great that an electrolyte common to all cells may be used without overriding problems related to the short circuiting of the battery by the common electrolyte.

When immersion type batteries are used for relatively short discharges lasting from ¼ hr. or less, the leakage currents are usually so minor that the battery can be made completely open to the electrolyte. However, for longer discharge rates and in order to obtain maximum useful work from the battery, it has been found desirable to minimize the leakage currents by providing constrictions in the electrolyte feed passages. When this is done, another factor enters the picture. Reaction products formed as a result of the battery discharge collect in the feed passages and can seriously interfere with the behavior of the battery. The purposes for which seawater batteries are used require that the battery becomes operable in as short a time as possible. The time required for a battery to build up to operating voltage after immersion is often known as the "rise time" or activation time of the battery. In generalities, a battery to be used for a short discharge rate is expected to have a short rise time whereas the rise time of a battery that must operate over a long time period is usually expected to be longer. The shape, length and area of the feed ducts all have an effect on the rise time of a seawater battery. The more narrow and tortuous the feed ducts the longer it will take for the battery to fill and the slower will be the rise time.

Many investigators have worked to determine the best configuration for the electrolyte feed channels for use in water activated batteries for particular applications.

Batteries have been designed having long individual pipes for entrance and exit of electrolyte. Batteries have been designed with internal spaces in which the residual materials may collect without harm.

In certain electrical devices, it has been found expedient to "ground" the frame or to have one common uninsulated conductor, often having considerable exposed metal surface. When such a device is used with an ordinary seawater battery in a total immersion mode, the leakage currents are found to be considerably greater than when the device is constructed without the grounded frame. The grounded frame may be connected to the positive or the negative of the battery depending upon the electrical circuit used.

An annoying feature of some seawater batteries is that they have a fluctuating output voltage. The fluctuations may be perhaps 0.5% of the output voltage, they may occur quite rapidly. When used with accoustive devices, the voltage fluctuations result in a background "noise" that reduces the sensitivity of the device.

Batteries of the type suitable for use with the present invention are used at moderage depths below the surface of the water — say down to 50 or 60 ft. They may also be required to operate at considerably greater depths, up to several thousand feet. The static pressures on the battery and other equipment are correspondingly great. It has been found that the leakage currents under high pressure conditions are greater than the leakage current at near surface pressures.

SUMMARY OF THE INVENTION

Each cell of a multi-cell seawater battery has a top passage and a bottom passage running parallel to the plates and continuously open to the electrolyte area of the cell. A plurality of alternately located ports serves to connect the several top passages together in series to provide a continuous vent open at one end to the space outside of the battery. A means is provided to supply seawater to the passages at the bottom of each cell. In a first embodiment, the means is a series of ports in line. In a second embodiment, the means includes a series of alternately located ports connecting the several bottom passages into a single feed similar in shape to the vent at the top of the battery.

The supply means of the first embodiment is preferred for discharges lasting from approximately 30 minutes to 3 hours. The supply means of the second embodiment is preferred for discharges lasts for periods up to 12 hours or so.

The object of this invention is to provide a seawater type battery having improved voltage stability, reduced leakage to an external ground and uniform output.

Under the service conditions for which batteries using the present invention are designed, it has been found that the improved top porting reduces the leakage current to ground by a factor of from about 3 to 8 or more. It has also been observed that the top port of the invention reduces the "noise" factor of the battery by a considerable degree. The reduced noise can be observed by electronic devices calibrated in noise units and even by voltmeter readings of the output voltage. These and further features of the invention will be apparent from the detailed description and examples that follow.

DESCRIPTION OF THE PREFERRED EMBODIMENT

Figure 1:
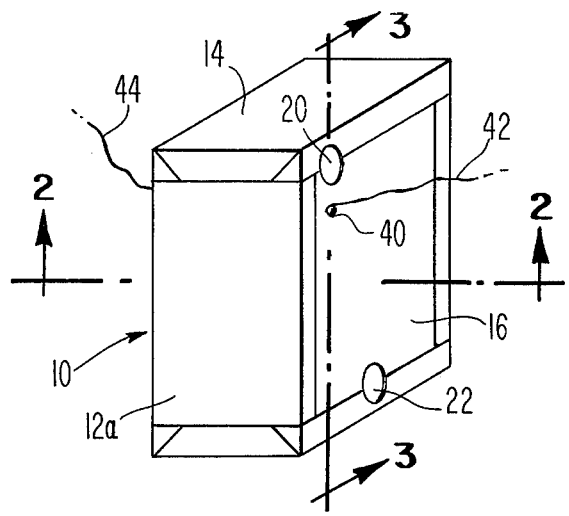
FIG. 1 represents in perspective a battery embodying the present invention.

Seawater batteries of the type relating to the present invention are single discharge devices often used in considerable quantity and thus are expected to be as simple and low cost in design as is consistent with reliability in all its aspects. The battery to be described is of such a nature, although the concept of the present invention is not limited solely to the present detailed description. In FIG. 1, 10 represents in perspective a completed battery embodying the invention.

A more complete description of the basic battery used as example in this application will be found in my copending application titled "Simplied Seawater Battery" filed on the same day as this application.

A sidewall 12a, a top 14 and an endwall 16 are shown. A second sidewall 12b, bottom 15 and second endwall 18 (see further figures) complete the external features of the battery. In one simplied form and that of FIG. 1 and following, the endwalls are made of stiff plastic sheet and the sidewalls, the top and the bottom are one or more ribbons of adhesively coated insulating tape wrapped around the endwalls and thus containing the battery. Alternately, the top wall and the bottom wall may be formed by dipping the top and the bottom of the battery in a liquid mix and then allowing the mix to solidify.

It should be pointed out, however, that the invention is equally as applicable to more conventional battery designs such as those having a molded container and cover cemented thereto.

In endwall 16, a top port 20 is shown adjacent top 14 and sidewall 12. A second port 22 is also shown adjacent the bottom of the battery.

Figure 2:
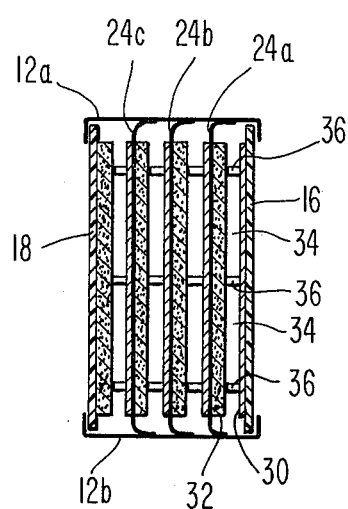
FIG. 2 represents cross section 2—2 of FIG. 1.

FIG. 2 is a horizontal cross section of the battery of FIG. 1 along the line 2—2. This battery comprises four cells. However, the invention has been used to advantage in batteries having up to 16 cells. The interior of the battery is divided into four cell compartments by the barriers 24a, 24b and 24c each barrier being located between each adjacent pair of cells of the battery. Note that there is one less barrier than the number of cells in the battery. In a battery of N cells, there will be N-1 non-conductive barriers. Electrodes (to be described later), the barriers and the endwalls are all parallel one with another.

In the battery illustrated, these barriers are made from a plastic sheet material such as Polyethylene Terephythalate sheet. They are cut somewhat wider than the endwalls 16 and 18 so that when the sidewalls 12a and 12b are applied they may be curled over to give a good contact to the adhesive of the sidewalls. In each cell is found a first electrode of a first polarity such as 30, a first electrode of a second polarity such as 32 and an electrolyte space 34. In operation, this space is filled with electrolyte, i.e., seawater, although other electrolytes might be used.

Normally the anodes or negative electrodes of seawater type batteries are metallic and are chosen from magnesium, zinc and aluminum, and the cathodes or positive electrodes are halides of metals such as lead chloride, siver chloride, copper chloride, etc. supported on a grid such as woven metal wire, expanded metal, etc. However, the invention is not necessarily limited to these specific electrodes.

The electrolyte space 34 is preserved by plate spacing means. In the design of FIG. 2, the means comprises a series of plastic buttons 36 adhered to the face of one of the electrodes. Alternatively, sheeted materials such as non woven fabrics may be used for plate separation. A conductor 40 (FIG. 3) electrically connected to the first electrode of first polarity passes through endwall 16 and is in turn connected to wire 42, a similar arrangement provides a connection from the fourth electrode of second polarity to wire 44. Means such as metallic rivets or other fasteners (46a, 46b, FIG. 3) serve to electrically connect the first electrode of second polarity to the third electrode of first polarity and so on along the battery to put all cells in series array.

Figure 3:
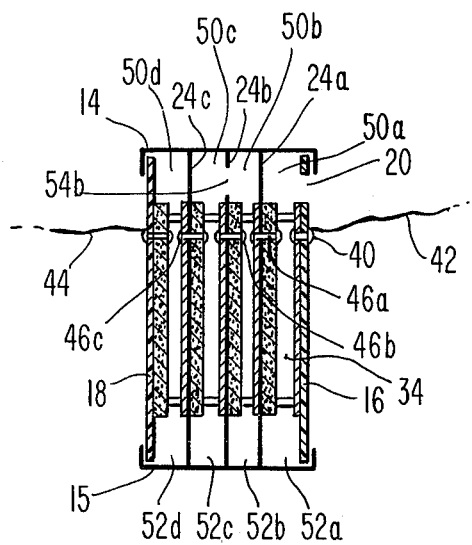
FIG. 3 represents cross section 3—3 of FIG. 1.

FIG. 3 depicts in section the battery of FIG. 1 along the line 3—3. The electrodes 30 and 32 are somewhat shorter than the full heights of the battery so as to leave a top passage 50a and a bottom passage 52a within the structure. The top passage 50a runs from sidewall 12a to sidewall 12b and is defined by the first endwall 16, the first barrier 24a and the battery top 14. Further it is continuously open to the electrolyte space 34 of the first cell. The bottom passage 52a likewise runs from sidewall 12a to sidewall 12b and is defined by the battery bottom 15 the first endwall 16 and the first barrier 24a. The first bottom passage is also continuously open to the electrolyte space 34 of the first cell. Similar top passages 50b, 50c, 50d and bottom passages 52b, 52c and 52d defined in turn by the barriers and the second endwall are associated with each of the succeeding cells of the battery.

The first top port 20 formed in the first endwall 16 of the battery is located near to the first sidewall 12a. This port provides access between the first top passage 50a and the space external to the battery.

Figure 4:
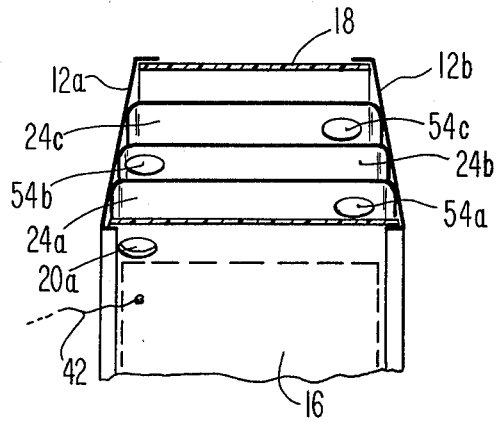
FIG. 4 represents the top of the battery of FIG. 1 prior to sealing.

FIG. 4 is an angle view of the top of the battery of FIG. 1 prior to the application of the battery top. It shows the location of the additional top ports forming an important portion of the present invention. 54a is a second top port, formed in the barrier 24a, between the first cell and the second cell. Port 54a provides access between the second top passage 50b and the first top passage 50a. Port 54a is located adjacent to the second sidewall 12b of the battery. Further, top ports 54b and 54c are provided, one formed in each barrier, the ports being consecutively located near to the first sidewall 12a and the second sidewall 12b of the battery and each further top port providing access between adjacent top passages. It is to be noted that there is no top port in the second endwall 18 of the battery. In a construction of N cells, the last port would be located in the barrier between the N-1th and the Nth cell. The several top passages, N in number, the several ports in the barriers, N—1 in number and in staggered array along with the single port through the first endwall together form a conduit running indirectly from the endwall port to and including the passage over the Nth cell. The path of this conduit being of zig-zig form comprising a series of straight portions connected by reverse bends, the straight portions running from the first side of the battery to the second side thereof. The conduit is further identified in that at one end it connects to the exterior of the battery, at its second end it is confined to the opening to the top of the Nth cell and that in its course it also opens to the tops of the remaining N−1 cells.

A means for providing access between the space external to the battery and the several bottom passages 52a–52d is also provided.

Figure 5:
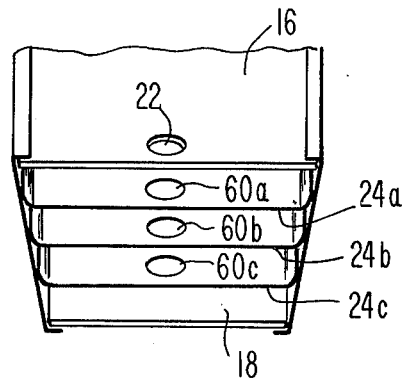
FIG. 5 represents the bottom of the battery of FIG. 1 prior to sealing.

In a first embodiment and as shown in FIG. 5, access to the several bottom passages is provided by a series of bottom ports 22, 60a, 60b and 60c all located on a single axis perpendicular to the first endwall of the battery, port 22 being located in the first endwall 16 and providing access between the first bottom passage 52a and the space external to the battery, port 60a being located in the first barrier 24a and providing access between the second bottom passage 52b and the first bottom passage 52a, port 60b being located in the second barrier 24b and providing access between the third bottom passage 52c and the second bottom passage 52b, and the port 60c being located in the third barrier 24c and providing access between the fourth bottom passage 52d and the third bottom passage 52c. For a battery having N cells, there will be one bottom port located in the first endwall of the battery and N−1 ports each respectively located in the N−1 barriers of the battery and all ports located on the same axis.

In a second embodiment of the invention, the ports are in a staggered relationship as described for the location of the top ports.

Batteries built according to the first embodiment will activate in a comparatively short time but will have a comparatively high leakage whereas batteries built according to the second embodiment take longer to activate and have lower leakage.

In a third embodiment of the invention, and for use particularly with a grounded electrical system, in a battery of N cells the first electrode of first polarity is selected as the polarity of the grounded portion of the electrical circuit to which it will be attached and the Nth electrode of second polarity then becomes the second terminal electrode of the battery.

It has been found that by following the teaching of the present invention, maximum utilization of the electrical capacity of the battery is obtained with a minimum loss due to leakage currents. It has further been observed that the voltage of the battery during discharge is more even than when, for instance, a battery is built according to older teachings with the top ports all on a single axis. It is now believed in the case of the battery with top ports on a single axis that gas bubbles resulting from the normal discharge reactions of the battery collect and then disperse in a random manner in individual cells blocking off some of the active area of the plates to a degree such that the terminal voltage of the battery is also randomly uneven. On the other hand, in the battery using the present invention, there is a steady flow of electrolyte through the several top passages which is sufficient to wash out the gas as it collects and thus prevents the gas from blanketing off the active surface of the battery plates.

To illustrate the utility of the present invention, a series of discharges are shown in FIGS. 6 to 13. The batteries used for these tests were developed to meet a complicated test regime. The test regime includes the following steps in immediate sequence:

a. shorting the battery with a 0.1 ohm fuse;
b. inserting the battery 1.5% saline water at 0° C. until the fuse burns out;
c. continuing the discharge on a 42 ohm load until the total elapsed time is 180 seconds.
d. changing the electrolyte to 3.6% saline solution at 35°C. and the final load resistance to 87 ohms or 135 ohms and continuing the discharge until the battery is discharged.

This is admittedly a complicated test. However, the batteries are designed to give about 3 hours or more on this test with the 87 ohm load and about 8 hours with the 135 ohm load, so that in effect the discharge is a fixed resistance discharge. It is believed that the improvements obtained by the use of the invention are not restricted to this particular discharge regime but will be found with any discharge lasting from 3 to 8 hours or more.

Figure 6:
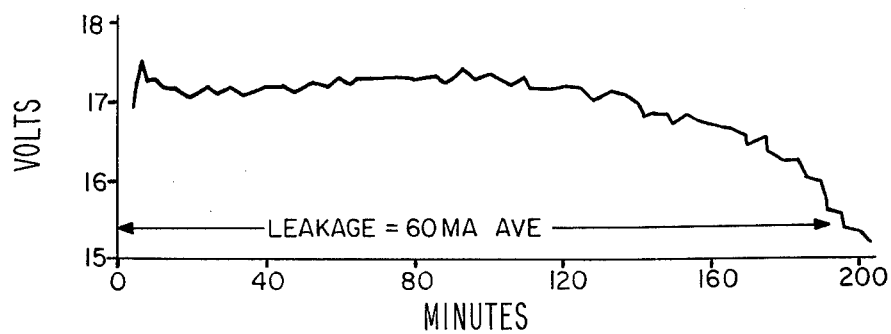
FIG. 6 represents a typical discharge of lead chloride-magnesium battery without the invention.
Figure 7:
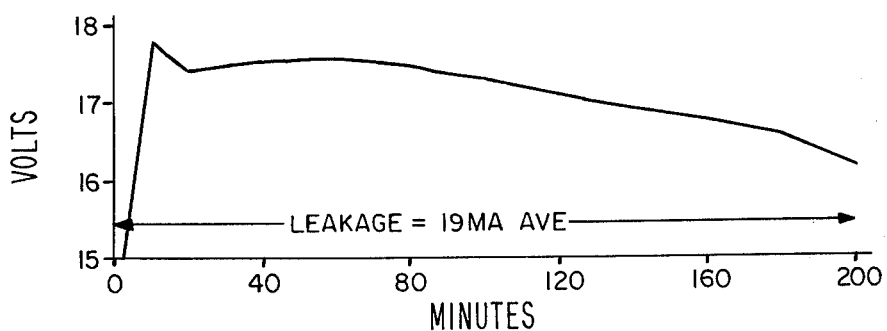
FIG. 7 represents a typical discharge of a similar battery having the invention.

FIG. 6 shows the terminal voltage with respect to time during a typical discharge of about 3 hours duration of a 16 cell lead chloride-magnesium battery. The battery was a design known prior to the present invention. It was constructed with top ports as well as bottom ports in line as described and shown in FIG. 5. The negative terminal was connected to a metallic plate of a chosen size representing the frame of the electronic device, and the leakage current from the terminal to this plate was measured. The leakage current ranged from a low of 25 millamperes to at least 65 Ma with an average of about 60Ma. FIG. 7 shows the same information during the discharge of a battery identical in every way to battery 1 except using the top porting of the present invention and as shown for instance in FIG. 4. Bottom porting of this battery was as shown in FIG. 5. Several areas of improvement will be noted in FIG. 7 compared with FIG. 6.

a. The time of discharge to any chosen voltage is greater in FIG. 7;
b. The actual voltage at any time is higher in FIG. 7 than FIG. 6 indicating a greater power capacity;
c. The voltage of FIG. 7 is much more even than FIG. 6 indicating that the noise level is greatly reduced; and
d. The leakage current of FIG. 7 is about one-third that of FIG. 6.

Figure 8:
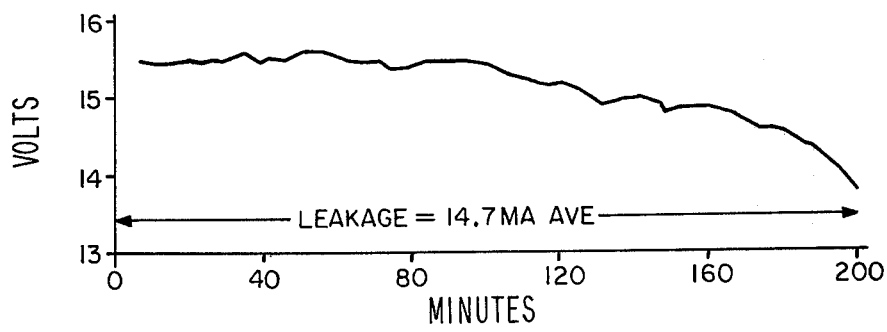
FIG. 8 represents a typical discharge of a silver chloride battery without the invention.
Figure 9:
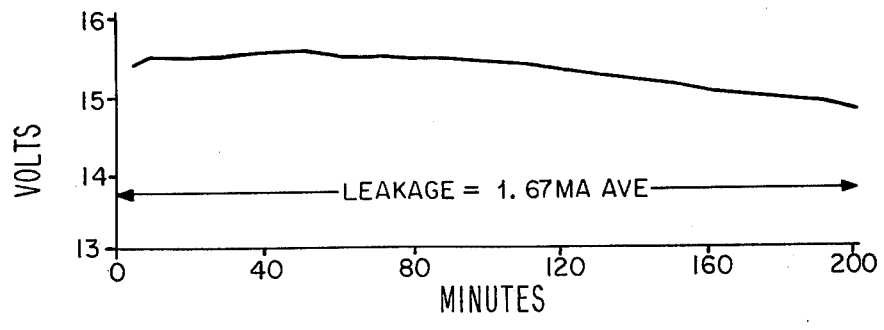
FIG. 9 represents a typical discharge of a similar batter with the invention.

FIGS. 8 and 9 compare similarly 13 cell silver chloride-magnesium batteries. The battery of FIG. 8 used a construction similar to battery No. 6 and the battery of FIG. 9 used a construction similar to battery No. 7.

In comparing FIG. 8 to FIG. 9, the same four (4) improvement areas are seen. The reduction in the leakage current of FIG. 9 over FIG. 8 is even greater than the improvement of FIG. 7 over FIG. 6; namely, about 1/9th the current.

Figure 10:
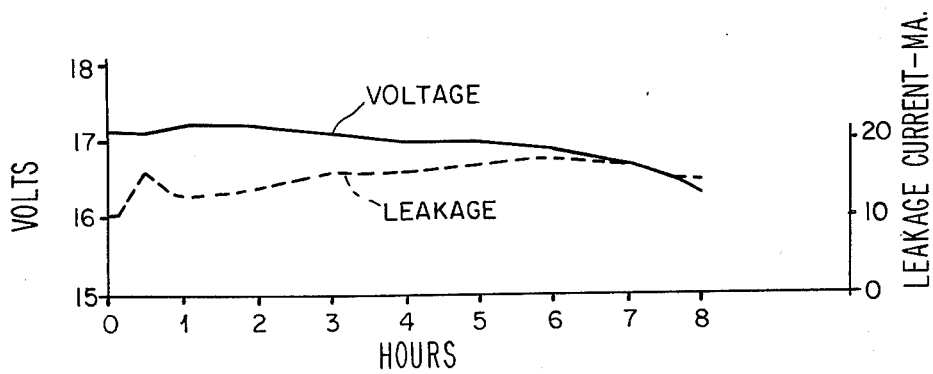
FIG. 10 represents the discharge of a battery similar to that of FIG. 7 but embodying a further embodiment of the invention.

FIG. 10 is the discharge voltage of a 16 cell lead chloride magnesium battery similar in design to the battery of FIG. 7 but having a circuitous passage at the bottom as well as at the top. A final load resistance of 135 ohms was used to give a discharge lasting approximately 8 hours. Compared to FIG. 7 it is seen that the change in bottom porting has reduced the leakage current over the first three hours to an average of 15 Ma. and that over the 8 hour period it is below 18 Ma.

Figure 11:
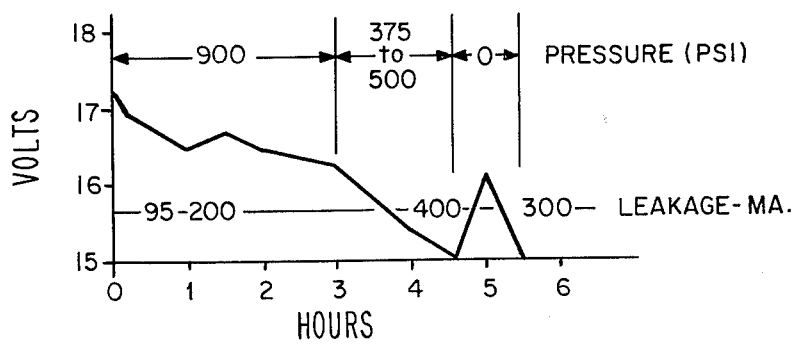
FIG. 11 represents the discharge of a battery similar to that of FIG. 6 under high pressure conditions.

FIG. 11 shows the discharge of a 16 cell lead chloride magnesium battery of the design of FIG. 6, under high pressure conditions. Due to experimental difficulties the pressure varied from about 500 to 900 lbs per sq. inch, averaging perhaps 850 PSI. Leakage currents vary from an initial 95 ma to 400 ma final. The final load resistance was 87 ohms.

Figure 12:
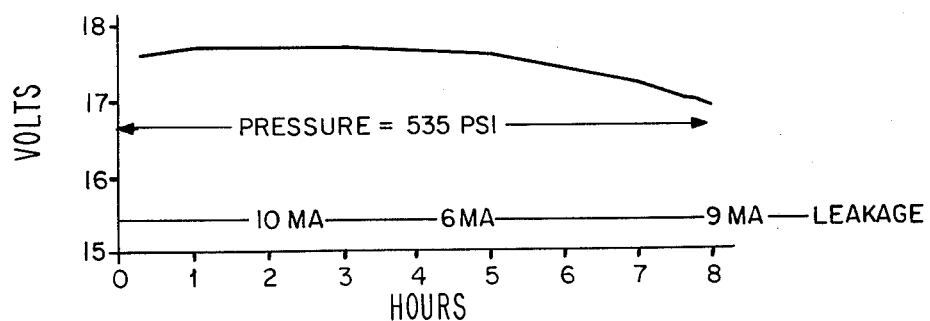
FIG. 12 represents the discharge of a battery similar to that of FIG. 7 under high pressure conditions.

FIG. 12 shows the discharge of a 16 cell lead chloride magnesium battery similar to that of FIG. 11 but having porting similar to FIG. 10 i.e. zig-zag ports at both top and bottom. The pressure during the test of FIG. 11 was held at 535 lbs per sq. in. The final load resistance in this test was 135 ohms. The low leakage current of 8 ma throughout the test is believed to be significant in spite of the several noted differences between the two tests.

Figure 13:
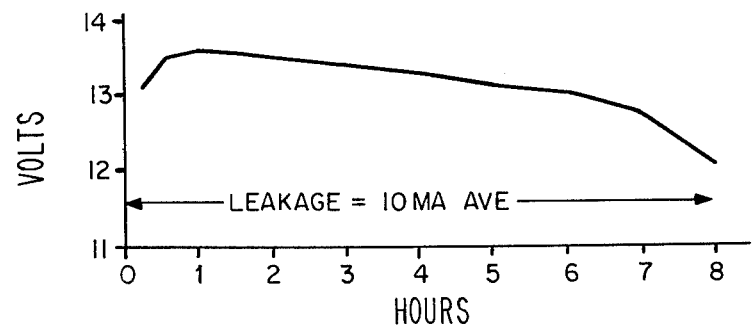
FIG. 13 represents the discharge of a battery similar to that of FIG. 10 but having fewer cells.

FIG. 13 illustrates the discharge of a lead-chloride magnesium seawater battery similar to that of FIG. 10 but having 13 cells.

From these examples, it can be seen that the improvements provided by the present invention are not limited to a particular type of seawater couple, number of cells or discharge rate but will appear with variations in each of these parameters. However, in the testing, no attempts has been made to find the limits of number of cells and discharge time over which the invention shows improvement. It is believed to be well beyond these typical examples as will be recognized by those skilled in the art.

Having described my invention and shown its utility as applied to several conditions of useage, I now claim:

1. In a Multicell Seawater Battery of N cells each cell including a first electrode, a second electrode and an electrolyte space therebetween, the battery having a top, a bottom, a first sidewall and a second sidewall, a first endwall adjacent to the first cell and a second endwall adjacent the Nth cell, N—1 non conductive barriers, a barrier located between each adjacent pair of cells of the battery, the electrodes of the cells, the endwalls and the barriers being parallel one to another, the improvements comprising:
   a. a first top passage running from sidewall to sidewall, the first top passage defined by the battery top, the first endwall and the first barrier, the first top passage being continuously open to the electrolyte space of the first cell;
   b. a second top passage running from sidewall to sidewall, the passage defined by the battery top, the first barrier and the second barrier, the second top passage being continuously open to the electrolyte space of the second cell;
   c. further top passages running from sidewall to sidewall, one for each additional cell, each further top passage except the top passage of the Nth cell defined by the battery top and two adjacent barriers, the top passage of the Nth cell being defined by the battery top, the N—1th barrier and the second endwall, and each further top passage being continuously open to the electrolyte space of its cell;
   d. a first bottom passage running from sidewall to sidewall, the first bottom passage defined by the battery bottom, the first endwall and the first barrier, the first bottom passage being continuously open to the electrolyte space of the first cell;
   e. a second bottom passage running from sidewall to sidewall the second bottom passage defined by the battery bottom, the first barrier and the second barrier, the second bottom barrier, the second bottom passage being continuously open to the electrolyte space of the second cell;
   f. further bottom passages running from sidewall to sidewall one for each additional cell, each further bottom passage except the bottom passage for the Nth cell defined by the battery bottom and two adjacent barriers, the bottom passage of the Nth cell being defined by the battery bottom, the N-1th barrier and the second endwall, and each further bottom passage being continuously open to the electrolyte space of its cell;
   g. a first top port formed in the first endwall of the battery located near to the first sidewall of the battery the first top port providing access between the first top passage and the space external to the battery;
   h. a second top port formed in the barrier between the first cell and the second cell, the second top port providing access between the second top passage and the first top passage, the second top port being located near to the second sidewall of the battery;
   i. further top ports one formed in each further barrier including the barrier between the N-1th cell and the Nth cell the further ports being located consecutively near to the first sidewall of the battery and the second sidewall thereof, each further top port providing access between adjacent top passages, the series of N ports and N passages forming a conduit the path of the conduit being of zig-zag form comprising a series of straight portions connected by reverse bends, the straight portions running from the first side of the battery to the second side thereof; and,
   j. a means for providing access between the space external to the battery and the several bottom passages of the battery.

2. A battery as defined in claim 1 wherein the means for providing access between the space external to the battery and the several bottom passages of the battery comprises a first port defined by the first endwall of the battery, and N—1 additional ports one in each barrier of the battery, the first port and the N—1 additional ports having the same axis.

3. A battery as defined in claim 1 wherein the means for providing access from the space external to the battery and the several bottom passages comprises a first bottom port formed in the first endwall of the battery located near to the first sidewall of the battery, the first bottom port porviding access between the first bottom passage and the space external to the battery; a second bottom port formed in the barrier between the first cell and the second cell, the second bottom port providing access between the second bottom passage and the first bottom passage, the second bottom port being located near to the second sidewall of the battery; and, further bottom ports one formed in each further barrier including the barrier between the N—1 th cell and the Nth cell, the further ports being located consecutively near to the sidewall near to which the first bottom port is located and near to the sidewall near to which the second bottom port is located, each further bottom port providing access between adjacent bottom passages.

4. A battery as defined in claim 3 wherein the first bottom port is near to the second sidewall of the battery and the second bottom port is near to the first sidewall of the battery.

5. A battery as defined in claim 1 wherein the polarity of the first electrode of first polarity is positive.

6. A battery as defined in claim 1 wherein the polarity of the first electrode of first polarity is negative.

7. A battery as defined in claim 1 wherein the first endwall is a sheet of non conductive material, the second endwall is a sheet of non conductive material, each non conductive barrier is a sheet of flexible material greater in width than the width of the endwalls and the top, the bottom, the first sidewall and the second sidewall are adhesively fastened to the first endwall, the second endwall and the non conductive barriers.

8. A battery as defined in claim 1 wherein the active ingredient of the positive electrode is selected from the group which consists of lead chloride, silver chloride, copper chloride and copper oxide and the negative electrode is selected from the group which consists of zinc metal, magnesium metal and aluminum metal.

* * * * *